(12) United States Patent
Zhang

(10) Patent No.: US 10,888,781 B2
(45) Date of Patent: Jan. 12, 2021

(54) GAME SCENE DISPLAY CONTROL METHOD AND SYSTEM AND STORAGE MEDIUM

(71) Applicant: NETEASE (HANGZHOU) NETWORK CO., LTD., Zhejiang (CN)

(72) Inventor: Bo Zhang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/335,264

(22) PCT Filed: May 19, 2017

(86) PCT No.: PCT/CN2017/085167
§ 371 (c)(1),
(2) Date: Mar. 21, 2019

(87) PCT Pub. No.: WO2018/209707
PCT Pub. Date: Nov. 22, 2018

(65) Prior Publication Data
US 2020/0061468 A1 Feb. 27, 2020

(51) Int. Cl.
*A63F 13/5252* (2014.01)
*A63F 13/92* (2014.01)

(52) U.S. Cl.
CPC .......... *A63F 13/5252* (2014.09); *A63F 13/92* (2014.09)

(58) Field of Classification Search
CPC .............................. A63F 13/5252; A63F 13/92
(Continued)

(56) References Cited

U.S. PATENT DOCUMENTS 8,425,330 B1 * 4/2013 Kislyi ..................... A63F 13/12
463/32
2012/0252576 A1 10/2012 Vange
(Continued)

FOREIGN PATENT DOCUMENTS

CN 101327375 A 12/2008
CN 103157281 A 6/2013
(Continued)

OTHER PUBLICATIONS

Devilisk, "Comprehensive DOTA 2 Guide", published to Steam on Apr. 2, 2015 and retrieved from Internet URL<https://steamcommunity.com/sharedfiles/filedetails/?id=123364976>. p. 1-55. (Year: 2015).*
(Continued)

*Primary Examiner* — Jay Trent Liddle
*Assistant Examiner* — Ryan Hsu
(74) *Attorney, Agent, or Firm* — Novick, Kim & Lee, PLLC; Allen Xue

(57) ABSTRACT

A game scene display control method and system and a storage medium are provided. A game includes a first game character which is controlled by a first client (210) and a second game character which is controlled by a second client (220), the first game character belongs to a first character faction (120), and the second game character belongs to a second character faction (130). The method includes: a first game content is displayed on the first client (210), the first game content including a first game scene (111); a second game content is displayed on the second client (220), the second game content including a second game scene (112), and the first game scene (111) is mirror imaging symmetrical to the second game scene (112).

15 Claims, 3 Drawing Sheets

(a)

(b)

(58) Field of Classification Search
USPC .......................................................... 463/31
See application file for complete search history.

(56) References Cited

U.S. PATENT DOCUMENTS

2015/0157929 A1    6/2015  Hall et al.
2016/0001184 A1    1/2016  Sepulveda et al.

FOREIGN PATENT DOCUMENTS

| CN | 105099883 A | 11/2015 |
| CN | 105148517 A | 12/2015 |
| CN | 105194873 A | 12/2015 |
| CN | 105597310 A | 5/2016 |
| CN | 105879391 A | 8/2016 |
| CN | 105903193 A | 8/2016 |
| CN | 105938629 A | 9/2016 |
| CN | 107050862 A | 8/2017 |
| JP | 2015016072 A | 1/2015 |

OTHER PUBLICATIONS

Pr3posterous League of Legend—blue side red side controversy. www.reddit.com. Dec. 31, 2015 (Dec. 31, 2015). Post.

* cited by examiner

GAME SCENE DISPLAY CONTROL METHOD AND SYSTEM AND STORAGE MEDIUM

TECHNICAL FIELD

The present disclosure relates to the field of games, and in particular to a game scene display control method and system and a storage medium.

BACKGROUND

Generally, in a battle game, such as a Multiplayer Online Battle Arena (MOBA), bases of two bases of different factions are respectively positioned at both ends of a game scene. Virtual characters of these two factions are respectively born in corresponding bases, and attack is made to a middle zone of the game scene or to an enemy base in a game process.

SUMMARY

In one embodiment of the present disclosure, a game scene control method is provided. A game includes a first game character which is controlled by a first client and a second game character which is controlled by a second client, the first game character belongs to a first character faction, and the second game character belongs to a second character faction, the method including: displaying a first game content on the first client, the first game content including a first game scene; displaying a second game content on the second client, the second game content including a second game scene, and the first game scene is mirror imaging symmetrical to the second game scene.

In at least one embodiment of the present disclosure, a game scene control system is further provided, including: a first client, configured to control a first game character, a second client, configured to control a second game character, the first game character belongs to a first character faction, and the second game character belongs to a second character faction, and the first client is further configured to display a first game content, the first game content including a first game scene; the second client is further configured to display a second game content, the second game content including a second game scene, and the first game scene is mirror imaging symmetrical to the second game scene.

In at least one embodiment of the present disclosure, a computer readable storage medium is further provided, in which at least one computer program is stored, and the game scene display control method in any one of above-mentioned embodiments is implemented when the at least one computer program is executed by at least one processor.

BRIEF DESCRIPTION OF THE DRAWINGS

Drawings of the present disclosure are provided to further understand the present disclosure and form a part of the application. Exemplary embodiments and description of the present disclosure are adopted not to limit the present disclosure but to explain the present disclosure. In the drawings.

DETAILED DESCRIPTION

In order to enable those skilled in the art to understand technical solutions of the present disclosure more clearly, technical solutions of embodiments of the present disclosure are clearly and completely described together with the drawings of the embodiments. Apparently, described embodiments are a part of the embodiments of the present disclosure instead of all. On the basis of the embodiments of the present disclosure, all other embodiments obtained on the premise of no creative work of those skilled in the art fall within the protection scope of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

In an embodiment of the present disclosure, an embodiment of a game scene display control method is provided. It needs to be noted that steps shown in the flow charts of the drawings may be executed in a computer system such as a group of computer executable instructions; in addition, although logic sequences are shown in the flow charts, in some situations, steps illustrated or described may be executed in sequences different from those illustrated here.

Figure 1:
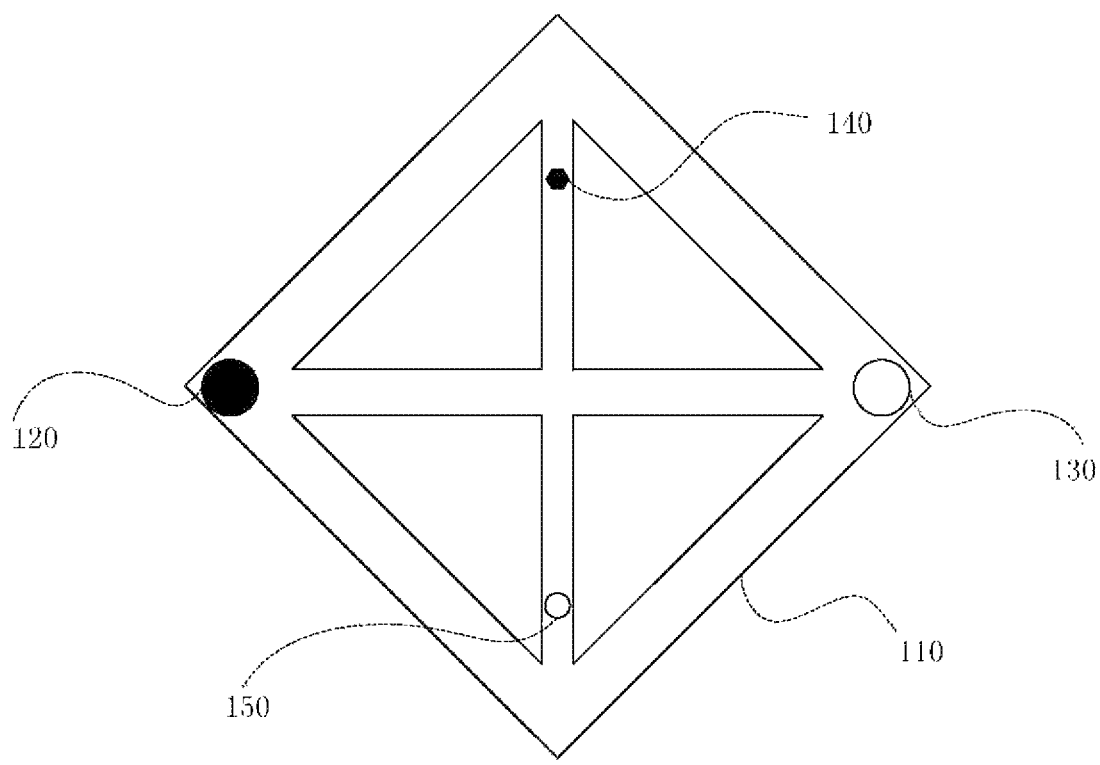
FIG. 1 shows a schematic plan of a game scene of a battle game according to the related art.

FIG. 1 shows a schematic plan of a game scene of a battle game, a base 120 of a first character faction is positioned at one end of a game scene 110, and a base 130 of a second character faction is positioned at the other end of the game scene 110.

Figure 2:
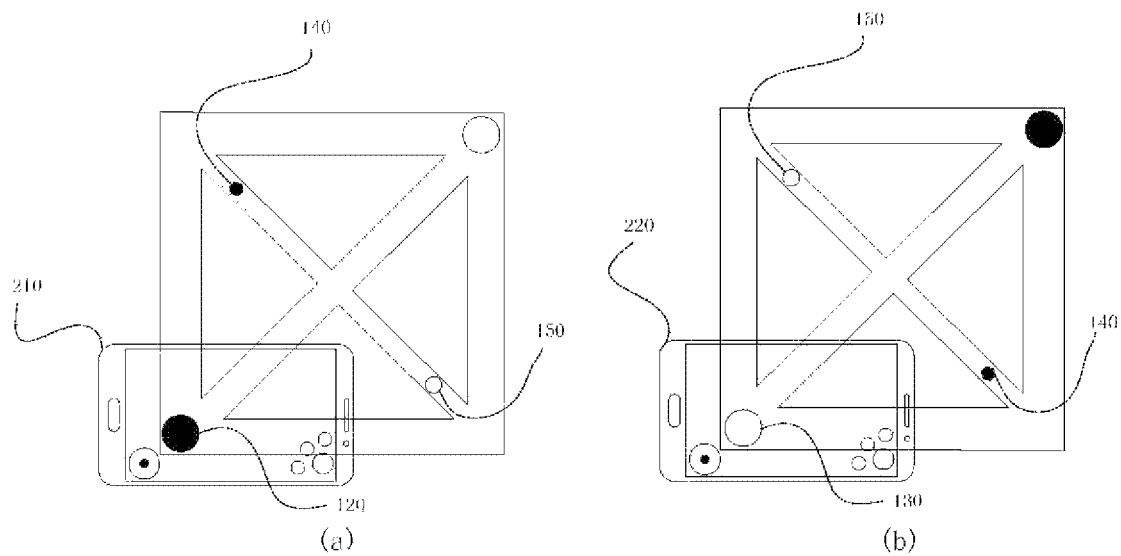
FIG. 2 shows a schematic diagram of graphic user interfaces of game clients of two different factions on screens according to the related art.

In a Related mobile terminal battle game, to enable a game player to hold a mobile terminal to operate conveniently, and to reduce shielding of the game scene by operation buttons in a graphic user interface, bases of two factions are generally displayed at lower left parts of mobile terminal display screens of respective factions when a game starts in a game scene display control process. For example, FIG. 2 shows a schematic diagram of graphic user interfaces of game clients of two different factions on screens at one moment in the related art. As shown in FIG. 2(*a*), a base 120 of a first character faction is displayed at a lower left part of a mobile terminal 210 of the first character faction. As shown in FIG. 2(*b*), a base 130 of a second character faction is displayed at a lower left part of a mobile terminal 220 of the second character faction. Therefore, for game players of these two factions, virtual characters all start from the lower left parts of screens and attack towards enemy bases on the game scene.

Figure 3:
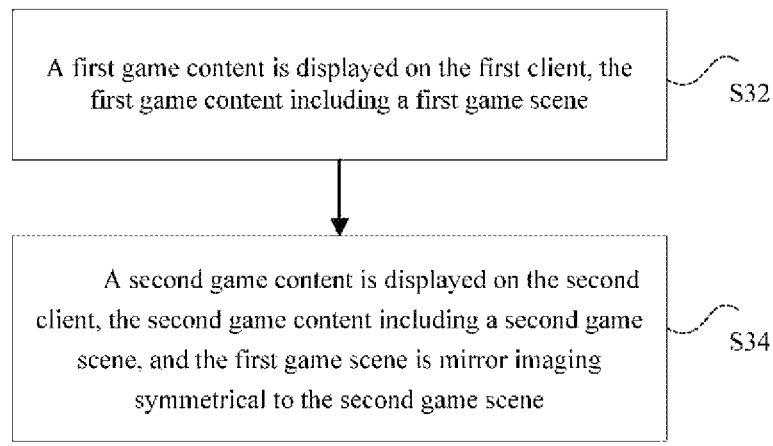
FIG. 3 shows a flowchart of a game scene display control method according to an embodiment of the present disclosure.

However, in the battle game, there are generally multiple paths (for example, paths which are called as "upper path", "middle path" and "lower path" by game players) from a creation position (namely a base) of ally characters to a fighting area or a creation position (namely a base) of enemy characters. And different paths generally have different strategic positions. In multiple battle games, the lower path is mostly acutely contested because of special resources. For example, high rewards such as a great deal of experience and money can be allocated to at least one virtual character and ally characters after the at least one virtual character defeats a special wild monster (such as a special wild monster in a first resource position 140 in FIG. 1 or FIG. 2) which is called as "small dragons" by game players. And relatively, there is a special wild monster (such as a special wild monster in a second resource position 150 in FIG. 1 or FIG. 2) which is called as "big dragons" by the game players. However, the small dragon is refreshed at an early stage of the game, so that the lower path needs more troops. On the contrary, fewer troops are needed on the upper path because of small amount of resources. As time passes, the game players would form strategic habits, and team members would form the rapport according to the strategic habits. As shown in FIG. 2 and FIG. 3, a related game scene display control mode maybe have defects that resources distributed in the game scene of the mobile terminal battle game are different in relative positions of different factions. For example, as shown in FIG. 2(a), for the base 120 of the first character faction, a first resource position 140 in the game scene is positioned in an upper path direction, and a second resource position 150 is positioned in a lower path direction. However, as shown in FIG. 2(b), for the base 130 of the second character faction, the second resource 150 in the game scene is positioned in the upper path direction, and the first resource 140 is positioned in the lower path direction. Such kind of resource distribution inconsistency not only affects fairness of the battle game, but also affects cultivation of the strategic habits of the game players, and the rapport of team members may also be affected in the games of team battle.

FIG. 3 shows a flow chart of a game scene display control method according to an embodiment of the present disclosure, a game includes a first game character which is controlled by a first client and a second game character which is controlled by a second client. The first game character belongs to a first character faction, and the second game character belongs to a second character faction. As shown in FIG. 3, the method may include the following steps.

At step S32, a first game content is displayed on the first client, the first game content including a first game scene.

At step S34, a second game content is displayed on the second client, the second game content including a second game scene.

And the first game scene is mirror imaging symmetrical to the second game scene.

In an optional embodiment of the present disclosure, the game is a Multiplayer Online Battle Arena (MOBA) game. The game includes the first character faction (such as a red faction) and the second character faction (such as blue faction). The first character faction includes at least one first game character (such as at least one hero), and the second character faction includes at least one second game character.

The number of the at least one first game character in the first character faction may be equal to the number of the at least one second game character in the second character faction. For example, both the number of the at least one first game character and the number of the at least one second game character are one, three, five, or other equal numbers. Optionally, the number of the at least one first game character in the first character faction may be different from the number of the at least one second game character in the second character faction. For example, the first character faction includes three first game characters, and the second character faction includes five second game characters.

Each game player respectively controls a game character to fight in the game scene on a game client of a mobile terminal. The first game character controlled by the first client belongs to the first character faction, and the second game character controlled by the second client belongs to the second character faction.

Figure 4:
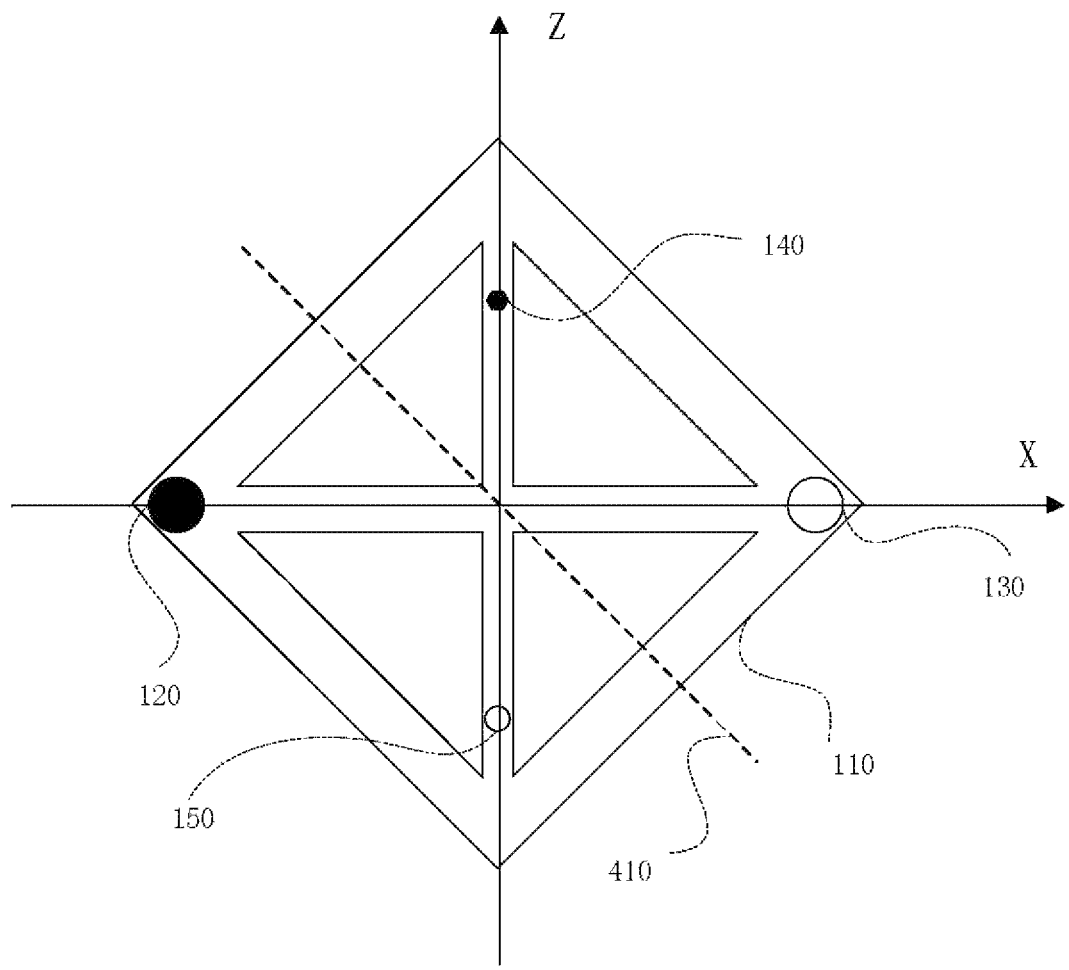
FIG. 4 shows a schematic plan of a game scene according to an embodiment of the present disclosure.

FIG. 4 shows a a schematic plan of a game scene according to an embodiment of the present disclosure. The game scene includes: a first character faction base 120, a second character faction base 130, a first resource position 140 and a second resource position 150. The first character faction base 120 and the second character faction base 130 are respectively positioned at both ends of the game scene. In the game, a first resource is positioned in the first resource position 140, and a second resource is positioned in the second resource position 150. The first resource may be a special wild monster which is called as "small dragon" by game players, and the second resource may be a special wild monster which is called as "large dragon" by the game players. After the small dragon or the large dragon is defeated or eliminated by at least one game character, the at least one game character, or a part of or all game characters of the faction of the at least one game character may obtain rewards such as a great deal of experience and money. The first resource may also be "gold ore", the second resource may also be "silver ore", and by digging the gold ore and the silver ore, the at least one game character, or a part of or all game characters of the faction of the at least one game character may obtain rewards such as a great deal of experience and money. The first resource and the second resource may also be resources of other modes, the first resource and the second resource are contested in modes of defeating, elimination, digging, etc. by the game character, and then the at least one game character, or a part of or all game characters of the faction of the at least one game character may obtain rewards such as experience and money.

To describe and calculate conveniently, a coordinate system is established in the schematic diagram of FIG. 4. A direction that the first character faction base 120 appoints to the second character faction base is adopted as a direction X. A middle point of a connecting line between the first character faction base 120 and the second character faction base 130 is adopted as a coordinate original point. And a direction which passes through the original point and is perpendicular to the direction X is adopted as a direction Z. In an optional embodiment, a plane XZ is a ground plane of the game scene. As shown in FIG. 4, a direction which passes through the original point and is perpendicular to a paper surface outwards is a direction Y.

Figure 5:
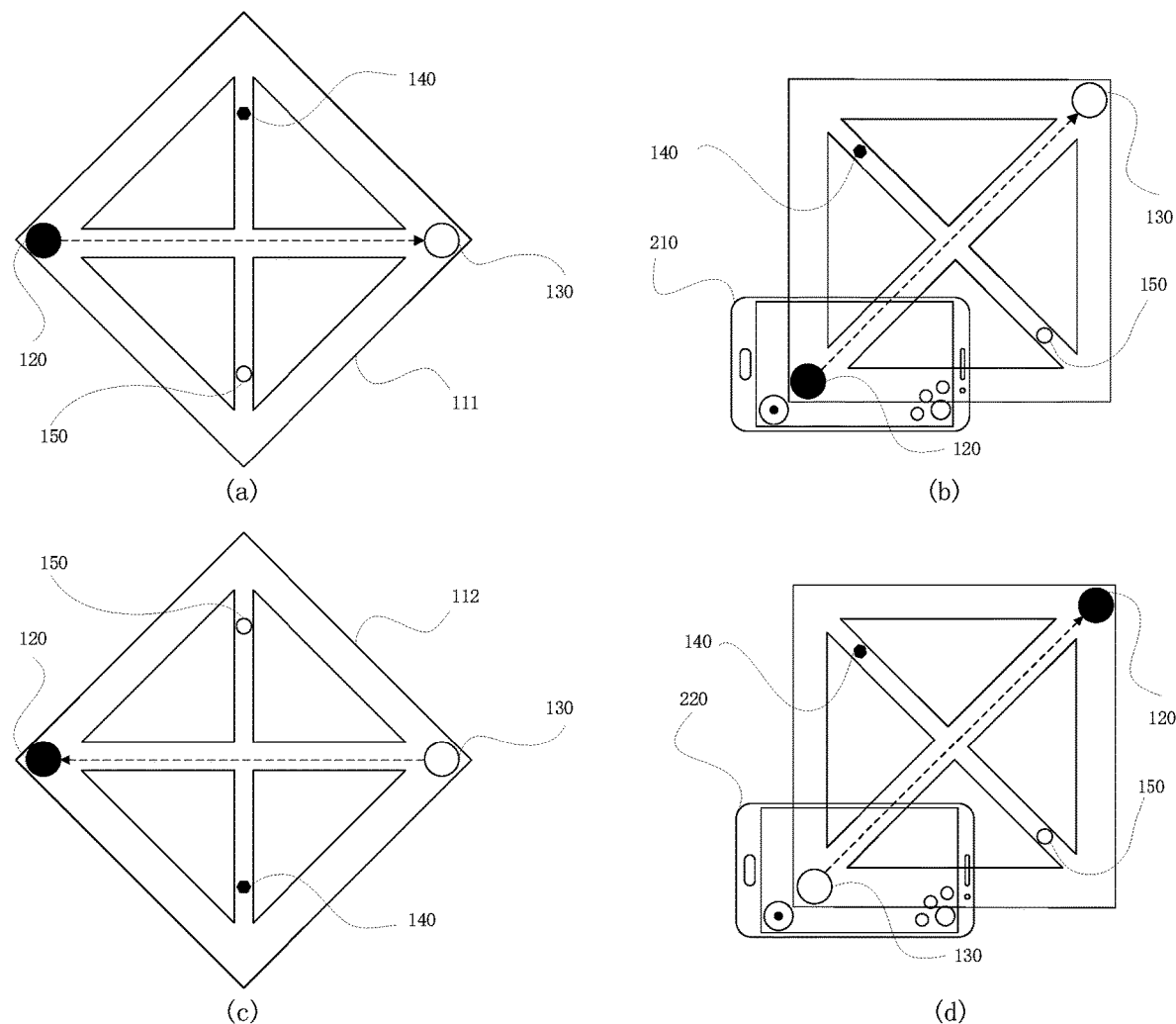
FIG. 5 shows a schematic diagram of a first game scene and a second game scene being symmetrical mirror images of one another and display of the first game scene and the second game scene on clients according to an embodiment of the present disclosure.

A game scene schematic plan of FIG. 5(a) is seen from a position of a positive direction of axis Y in FIG. 4. As shown in FIG. 5(a), in the game scene schematic plan (in a first game scene 111), the first resource position 140 is positioned on the left side of a direction (a direction that the first character faction base 120 appoints to the second character faction base 130) illustrated by a dotted arrow, and the second resource position 150 is positioned on the right side of the direction illustrated by the dotted arrow.

A game scene schematic plan of FIG. 5(c) is seen from a position of a negative direction of axis Y in FIG. 4. As shown in FIG. 5(c), in the game scene schematic plan (in a first game scene 112), the first resource position 140 is positioned on the left side of a direction (a direction that the second character faction base 130 appoints to the first character faction base 120) illustrated by a dotted arrow, and the second resource position 150 is positioned on the right side of the direction illustrated by the dotted arrow.

The first game scene 111 in FIG. 5(a) is mirror imaging symmetrical to the second game scene 112 in FIG. 5(c), and the plane XZ in FIG. 4 is a symmetrical plane.

As shown in FIG. 5(b), the first game scene 111 is displayed on a first client 210. As shown in FIG. 5(d), the second game scene 112 is displayed on a second client. The first game character controlled by the first client belongs to the first character faction, and the second game character controlled by the second client belongs to the second character faction. As shown in FIG. 5(b), for a character of the first character faction, the first resource position 140 is positioned on the left side of an attacking direction (a direction illustrated by a dotted arrow or a direction that the first character faction base 120 appoints to the second character faction base 130) in a "middle path" of the game character of the first character faction, and the second resource position 150 is positioned on the right side of the attacking direction in the "middle path" of the game character of the first character faction. As shown in FIG. 5(d), for a character of the second character faction, the first resource position 140 is also positioned on the left side of the attacking direction (the direction illustrated by the dotted arrow or a direction that the second character faction base 130 appoints to the first character faction base 120) in the "middle path" of the game character of the second character faction, and the second resource position 150 is also positioned on the right side of the attacking direction in the "middle path" of the game character of the second character faction.

Therefore, resources distributed in a game scene of a mobile terminal battle game are identical in relative positions of different factions, then the fairness of the baffle game is improved, and the cultivation of strategic habits of players and the rapport between team members are facilitated.

It needs to be noted that FIG. 5(b) and FIG. 5(d) show schematic diagrams that the first game scene is displayed on the first client and the second game scene is displayed on the second client. In practical game display control, three-dimensional effects of 2.5D and 3D may often be achieved.

In an optional embodiment, the first game scene is mirror imaging symmetrical to the second game scene, includes that: the first game scene is mirror imaging symmetrical to the second game scene, and a symmetrical mirror plane is a plane parallel to a ground plane of the first game scene or a plane parallel to a ground plane of the second game scene. In an optional embodiment, the symmetrical mirror plane is the ground plane of the first game scene or the ground plane of the second game scene.

For example, FIG. 4 shows a schematic plan of a game scene. The game scene is adopted as a first game scene, a plane parallel to the plane XZ is adopted as a symmetrical mirror plane. In an optional embodiment, the plane XZ is adopted as the symmetrical mirror plane to obtain a second game scene which is mirror imaging symmetrical to the first game scene. For a point (x1, y1, z1) in the first game scene, this point has a corresponding coordinate (x2, y2, z2) in the second game scene, where:

$x2=x1$, $y2=-y1+k$, $z2=z1$, and $k$ is a preset constant.

It can be seen that the first game scene and the second game scene with the plane parallel to the ground plane of the first game scene or the plane parallel to the ground plane of the second game scene as the symmetrical mirror plane have identical coordinates on the plane XZ or the ground plane. In an optional embodiment, k=0. That is, the symmetrical mirror plane is the ground plane of the first game scene or the ground plane of the second game scene and the plane XZ is taken as the symmetrical mirror plane.

For example, the first resource position 140 has a coordinate (x1, z1) in the XZ plane of the first game scene, and has a coordinate (x1, z1) in the plane XZ in the second game scene as well. The first client controls the first game character to move from an original point position (0, 0) on the plane XZ to the first resource position 140 (z1, z1) in the first game scene according to at least one received instruction. And the first game character also moves from the original point position to the first resource position 140 in the second game scene. For coordinate expression in a movement process, in the first game scene, the first game character moves to the position (x1, z1) from the position (0, 0), and similarly, in the second game scene, the first game character moves to the position (x1, z1) from the position (0, 0).

In an optional embodiment, the first game scene is mirror imaging symmetrical to the second game scene, includes that: the first game scene is mirror imaging symmetrical to the second game scene, and a symmetrical mirror plane is not parallel to the ground plane of the first game scene or the ground plane of the second game scene. For example, the symmetrical mirror plane is a plane perpendicular to the ground plane of the first game scene or a plane perpendicular to the ground plane of the second game scene.

For example, FIG. 4 shows the schematic plan of the game scene. The game scene is adopted as the first game scene, a plane which passes through a dotted line 410 (the dotted line 410 and a positive direction of axis X form an included angle of +135 degrees or −45 degree) in the FIG. 4 and is perpendicular to the plane XZ is adopted as the symmetrical mirror plane to obtain a second game scene which is mirror imaging symmetrical to the first game scene. And one point (x1, y1, z1) in the first game scene has a corresponding coordinate (x2, y2, z2) in the second game scene, where:

$x2=-z1$, $y2=-y1$, $z2=-x1$.

It can be seen that the first game scene and the second game scene with a plane which is not parallel to the ground plane of the first game scene or a plane which is parallel to the ground plane of the second game scene as the symmetrical mirror planes have different coordinates on the plane XZ or the ground plane.

For example, the first resource position 140 has the coordinate (x1, z1) in the XZ plane of the first game scene, and has the coordinate (−z1, −x1) in the plane XZ in the second game scene. The first client controls the first game character to move from the original point position (0, 0) on the plane XZ to the first resource position 140 (x1, z1) in the first game scene according to at least one received instruction, and the first game character also moves from the original point position on the plane XZ to the first resource position 140 in the second game scene. For coordinate expression in the movement process, in the first game scene, the first game character moves to the position (x1, z1) from the position (0, 0), and similarly, in the second game scene, the first game character moves to the position (−z1, −x1) from the position (0, 0).

It needs to be noted that as the plane XZ is the symmetrical mirror plane of the first game scene and the second game scene, a small calculation amount is needed, the plane XZ or the ground plane coordinates and operation logics are kept identical, and the embodiments are exemplary embodiments.

In an optional embodiment, the first game scene includes the first character faction base and the second character faction base, the second game scene includes the first character faction base and the second character faction base. When the game starts, the first character faction base is displayed in a first position on a screen of the first client, the second character faction base is displayed in a second position on a screen of the second client, and a relative position of the first position on the first client is identical to the relative position of the second position on the second client.

For example, when the game starts, the first character faction base 120 is displayed at the lower left part of the screen of the first client 210, and the second character faction base 130 is displayed at the lower left part of the screen of the second client 220. Or, when the game starts, the first character faction base 120 is displayed at the lower right part of the screen of the first client 210, and the second character faction base 130 is displayed at the lower right part of the screen of the second client 220. Or, when the game starts, the first character faction base 120 is displayed at the lower middle part of the screen of the first client 210, and the second character faction base 130 is displayed at the lower middle part of the screen of the second client 220.

In an optional embodiment, the attacking direction of the first character faction on the first client is identical to the attacking direction of the second character faction on the second client.

For example, as shown in FIG. 5(b), the first character faction base 120 is displayed at the lower left part of the screen of the first client 210, and a game character of the first character faction starts from a lower left direction of the screen of the first client and attacks towards the second character faction base 130 in the game scene on the screen of the first client. As shown in FIG. 5(d), the second character faction 130 is displayed at the lower left part of the screen of the second client 220, and a game character of the second character faction starts from a lower left direction of the screen of the second client and attacks towards the first character faction base 120 in the game scene on the screen of the first client.

In an optional embodiment, the first game scene includes the first character faction base and the second character faction base, the second game scene includes the first character faction base and the second character faction base. A first included angle is formed between a vector from the first character faction base in the first game scene to the second character faction base and a diagonal line of the screen of the first client. A second included angle is formed between a vector from the second character faction base in the second game scene to the first character faction base and a diagonal line of the screen of the second client. A difference between the first included angle and the second included angle is a, and a belongs to [−45 degree, +45 degrees]. In an optional embodiment, the first included angle is equal to the second included angle.

For example, as shown in FIG. 5(b), the first included angle is formed between the vector (of which the direction illustrated by the dotted arrow in FIG. 5(b)) from the first character faction base 120 to the second character faction base 130 and the diagonal line of the screen of the first client. As shown in FIG. 5(d), the second included angle is formed between the vector (of which the direction illustrated by the dotted arrow in FIG. 5(d)) from the second character faction base 130 to the first character faction base 120 and the diagonal line of the screen of the second client. In an optional embodiment, the first included angle is identical to the second included angle. That is, the difference a between the first included angle and the second included angle is 0. Therefore, the first included angle is identical to the second included angle, so that two battle factions obtain identical display and operation experience. In an optional embodiment, the difference a between the first included angle and the second included angle may be in a preset range, for example, a belongs to [−45 degree, +45 degrees].

In an optional embodiment, the first game content further includes a first game foreground, the second game content further includes a second game foreground.

And the first game foreground is mirror imaging symmetrical to the second game foreground.

In an optional embodiment, both the first game foreground and the second game foreground include multiple resource objects of which positions are moveable on the ground plane.

The game scene includes multiple resource objects (namely scene resource objects) which are relatively fixed on the ground plane or plane XZ. For example, resource objects such as grounds, mountains, stone, flowers, grass, trees and buildings. The game foreground includes multiple resource objects (namely foreground source objects) of which positions are generally moveable (unfixed) on the ground plane or plane XZ. For example, resource objects such as heroes, soldiers, wild monsters, large dragons, small dragons and skill casting effects.

In an optional embodiment, the first game foreground is mirror imaging symmetrical to the second game foreground includes that: the first game foreground is mirror imaging symmetrical to the second game foreground, and a symmetrical mirror plane between the first game foreground and the second game foreground is identical to a symmetrical mirror plane between the first game scene and the second game scene. In an optional embodiment, by taking the ground plane or plane XZ as the symmetrical mirror plane, the game scene and the game foreground are subjected to symmetrical mirror processing to obtain a first game content and a second game content as symmetrical mirror images. The first game content is displayed on the first client, and the second game content is displayed on the second client.

In an optional embodiment, before the first game content is displayed on the first client, different resource objects in the first game foreground are horizontally turned over, or before the second game content is displayed on the second client, different resource objects in the second game foreground are horizontally turned over.

In an optional embodiment, before the first game content is displayed on the first client, the first game character and the second game character in the first game foreground are horizontally turned over, or before the second game content is displayed on the second client, the first game character and the second game character in the second game foreground are horizontally turned over.

For example, for a game character before symmetrical mirror processing, the game character holds a weapon by the right hand, and after symmetrical mirror processing, the game character holds the weapon by the left hand. In order to avoid that foreground resource objects are not consistent in display because of the symmetrical mirror processing (particularly heroes controlled by game players in the foreground resource objects are not consistent), different foreground resource objects in the game foreground after the symmetrical mirror processing need to be horizontally turned over (since the game players are most sensitive to insistent heroes controlled by the game players). In the horizontal turnover process, coordinates of different foreground resource objects on the ground plane or plane XZ are kept unchanged, and then different foreground resource objects are turned over along a longitudinal middle axis on the screen. Therefore, the game character holds the weapon by the right hand, and display consistency of the game characters or foreground resource objects is maintained.

In an optional embodiment, the step of displaying the first game content on the first client includes that: a whole range of the first game content is displayed on the first client; or a partial range of the first game content is displayed on the first client; or a range size of the first game content displayed on the first client is adjusted according to at least one received operation instruction. In an optional embodiment, the step of displaying the second game content on the second client includes that: a whole range of the second game content is displayed on the second client; or a partial range of the second game content is displayed on the second client; or a range size of the second game content displayed on the first client is adjusted according to at least one received operation instruction.

For example, when the first game content is displayed on the first client, a whole range of the first game content is constantly displayed on the display screen of the first client for a game with a small game content range); or a partial range of the first game content is constantly displayed on the display screen of the first client for a game with a large game content range; or a range size of the first game content displayed on the display screen of the first client is adjusted by the first client according to the at least one received operation instruction. Similarly, a whole range of the second game content is constantly displayed on the display screen of the second client; or a partial range of the second game content is constantly displayed on the display screen of the second client; or a range size of the second game content displayed on the display screen of the second client is adjusted by the second client according to the at least one received operation instruction.

In another embodiment of the present disclosure, a game scene control system is also provided. The system may include: a first client which is configured to control a first game character, a second client which is configured to control a second game character. The first game character belongs to a first character faction, and the second game character belongs to a second character faction. The first client is further configured to display a first game content, the first game content including a first game scene; the second client is further configured to display a second game content, the second game content including a second game scene, and the first game scene is mirror imaging symmetrical to the second game scene.

In another embodiment of the present disclosure, a computer-readable storage medium is also provided. A program product capable of implementing the above method of the present specification is stored in the computer-readable storage medium. In some possible implementation manners, various aspects of the present disclosure may also be implemented in the form of a program product, which includes at least one program code for causing a terminal device to execute the steps according to various exemplary implementation manners of the present disclosure described in the "Exemplary Method" section of the present specification when the program product runs on a terminal device. It may use a portable Compact Disc Read-Only Memory (CD-ROM) and include at least one program code, and may run on a terminal device such as a personal computer. However, the program product of the present disclosure is not limited thereto, and in this document, the readable storage medium may be any tangible medium that contains or stores at least one program. The at least one program may be used by or in conjunction with an instruction execution system, device, or apparatus.

The program product may employ any combination of at least one readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with at least one wire, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

The sequence numbers of the foregoing embodiments of the present disclosure are for description and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

In some embodiments provided by the present disclosure, it shall be understood that the disclosed technical content may be implemented in other modes. For example, the apparatus embodiment described above is schematic. For example, the division of the modules or units is the division of logical functions, and there may be additional division modes during practical implementation. For example, a plurality of units or assemblies may be combined or integrated to another system, or some characteristics may be omitted or may be not executed; and in addition, displayed or discussed mutual coupling or direct coupling or communication connection may be performed via some interfaces, and indirect coupling or communication connection between apparatuses or units may be in an electrical form, a mechanical form or other forms.

The units illustrated as separate components may be or may not be physically separated. Components for unit display may be or may not be physical units. That is, the components may be located at a place or may be distributed on a plurality of network units. The aims of the solutions of the embodiments may be achieved by selecting some or all units according to actual requirements.

In addition, all function units in all embodiments of the present disclosure may be integrated in a processing unit, or each unit may exist separately and physically, or two or more units may be integrated in a unit. The integrated unit may be implemented in a hardware form or may be implemented in a software function unit form.

If the integrated unit is implemented in the form of a software function unit and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of instructions enabling a computer device (which may be a personal computer, a server or a network device) to execute all or some of the steps of the method according to each embodiment of the present disclosure.

The above are exemplary implementation manners of the present disclosure, and it should be pointed out that those of ordinary skill in the art can also make several improvements and modifications without departing from the principle of the present disclosure. These improvements and modifications should also be regarded as the scope of protection of the present disclosure.

INDUSTRIAL APPLICABILITY

As described above, the game scene display control method and system and the storage medium provided by embodiments of the present disclosure have the beneficial effects that the fairness of the baffle game, the cultivation of strategic habits of players and the rapport between team members are effectively ensured.

What is claimed is:

1. A game scene display control method for a game comprising: a first game character controlled by a first client and a second game character controlled by a second client, wherein the first game character belongs to a first character faction, and the second game character belongs to a second character faction, the game scene display control method comprising:
   displaying a first game content on the first client, the first game content comprising a first game scene;
   displaying a second game content on the second client, the second game content comprising a second game scene, wherein the first game scene is mirror imaging symmetrical to the second game scene,
   wherein the first game content further comprises a first game foreground, the second game content further comprises a second game foreground; and
   before the first game content is displayed on the first client, horizontally turning over at least part of resource objects in the first game foreground, or before the second game content is displayed on the second client, horizontally turning over at least part of resource objects in the second game foreground.

2. The method as claimed in claim 1, wherein an attacking direction of the first character faction on the first client is identical to an attacking direction of the second character faction on the second client.

3. The method as claimed in claim 1, wherein:
   both the first game scene and the second game scene comprise a first character faction base and a second character faction base;
   on the first client, a first included angle is formed between a vector from the first character faction base to the second character faction base and a diagonal line of a screen of the first client;
   on the second client, a second included angle is formed between a vector from the second character faction base to the first character faction base and a diagonal line of a screen of the second client; and
   a difference between the first included angle and the second included angle is a, and the a belongs to [−45 degree, +45 degrees].

4. The method as claimed in claim 3, wherein the first included angle is equal to the second included angle.

5. The method as claimed in claim 1, wherein:
   both the first game scene and the second game scene comprise a first character faction base and a second character faction base; and
   when the game starts, the first character faction base is displayed in a first position on a screen of the first client, and the second character faction base is displayed in a second position on a screen of the second client, wherein a relative position of the first position on the screen of the first client is identical to a relative position of the second position on the screen of the second client.

6. The method as claimed in claim 1,
   wherein the first game scene is mirror imaging symmetrical to the second game scene based on a symmetrical mirror plane and the symmetrical mirror plane is a plane parallel to a ground plane of the first game scene or a plane parallel to a ground plane of the second game scene.

7. The method as claimed in claim 1,
   wherein the first game scene is mirror imaging symmetrical to the second game scene based on a symmetrical mirror plane and the symmetrical mirror plane is a ground plane of the first game scene or a ground plane of the second game scene.

8. The method as claimed in claim 1,
   wherein the first game scene is mirror imaging symmetrical to the second game scene based on a symmetrical mirror plane and the symmetrical mirror plane is a plane perpendicular to a ground plane of the first game scene or a plane perpendicular to a ground plane of the second game scene.

9. The method as claimed in claim 1, wherein the first game foreground is mirror imaging symmetrical to the second game foreground.

10. The method as claimed in claim 9, wherein a symmetrical mirror plane between the first game foreground and the second game foreground is identical to a symmetrical mirror plane between the first game scene and the second game scene.

11. The method as claimed in claim 10, further comprising: before the first game content is displayed on the first client, horizontally turning over the first game character and the second game character in the first game foreground, or before the second game content is displayed on the second client, horizontally turning over the first game character and the second game character in the second game foreground.

12. The method as claimed in claim 9, wherein both the first game foreground and the second game foreground comprise multiple resource objects of which positions are moveable on a ground plane of the first game scene or a ground plane of the second game scene.

13. The method as claimed in claim 1, wherein displaying the first game content on the first client comprises:

displaying a whole range of the first game content on the first client; or displaying a partial range of the first game content on the first client; or adjusting a range size of the first game content displayed on the first client according to at least one received operation instruction.

14. A game scene display control system, comprising:

a first client, configured to control a first game character; and a second client, configured to control a second game character, wherein the first game character belongs to a first character faction, and the second game character belongs to a second character faction, wherein the first client is further configured to display a first game content, the first game content comprising a first game scene, the second client is further configured to display a second game content, the second game content comprising a second game scene, and the first game scene is mirror imaging symmetrical to the second game scene, wherein the first game content further comprises a first game foreground, the second game content further comprises a second game foreground, and wherein the first client is further configured to, before displaying the first game content, horizontally turn over at least part of resource objects in the first game foreground, or the second client is further configured to, before displaying the second game content, horizontally turn over at least part of resource objects in the second game foreground.

15. A non-transitory computer readable storage medium, in which at least one computer program is stored, and a game scene display control method is implemented as follows when the at least one computer program is executed by at least one processor:

displaying a first game content on a first client, the first game content comprising a first game scene;

displaying a second game content on a second client, the second game content comprising a second game scene, wherein the first game scene is mirror imaging symmetrical to the second game scene, wherein the first game content further comprises a first game foreground, the second game content further comprises a second game foreground; and before the first game content is displayed on the first client, horizontally turning over at least part of resource objects in the first game foreground, or before the second game content is displayed on the second client, horizontally turning over at least part of resource objects in the second game foreground.

* * * * *